| | |
|---|---|
| (12) United States Patent<br>Sheppard et al. | (10) Patent No.: US 9,452,660 B2<br>(45) Date of Patent: Sep. 27, 2016 |

(54) VALVE SYSTEM CONFIGURATIONS FOR WARMING AND COOLING TRANSMISSION FLUID

(71) Applicant: Dana Canada Corporation, Oakville (CA)

(72) Inventors: Jeff Sheppard, Milton (CA); Dario Bettio, Mississauga (CA); Sachin Bhatia, Mississauga (CA)

(73) Assignee: Dana Canada Corporation, Oakville, Ontario (CA)

( * ) Notice: Subject to any disclaimer, the term of this patent is extended or adjusted under 35 U.S.C. 154(b) by 428 days.

(21) Appl. No.: 14/208,320

(22) Filed: Mar. 13, 2014

(65) Prior Publication Data

US 2014/0262135 A1 Sep. 18, 2014

Related U.S. Application Data

(60) Provisional application No. 61/787,168, filed on Mar. 15, 2013.

(51) Int. Cl.
| | |
|---|---|
| *F01P 7/00* | (2006.01) |
| *B60H 1/00* | (2006.01) |
| *B60H 1/14* | (2006.01) |
| *F01P 7/16* | (2006.01) |
| *B60K 11/02* | (2006.01) |
| *F02N 19/10* | (2010.01) |
| *F16H 57/04* | (2010.01) |

(52) U.S. Cl.
CPC ............ *B60H 1/14* (2013.01); *B60H 1/00314* (2013.01); *F01P 7/165* (2013.01); *B60K 11/02* (2013.01); *F01P 2060/045* (2013.01); *F02N 19/10* (2013.01); *F16H 57/0413* (2013.01)

(58) Field of Classification Search
CPC ............ F28F 27/02; B60H 1/04; B60H 1/14; B60H 1/00314; B60H 1/00007; B60K 11/02; F16H 57/04; F16H 57/0412; F16H 57/0413; F16N 39/02; F16N 39/04; F02N 19/10; F01P 7/00; F01P 7/14; F01P 7/16; F01P 7/165; F01P 2060/045
USPC ......... 123/41.02, 41.05, 41.08, 41.09, 41.29, 123/41.31, 41.42, 41.57; 165/42; 180/339; 477/98; 475/161
See application file for complete search history.

(56) References Cited

U.S. PATENT DOCUMENTS

| | | | |
|---|---|---|---|
| 5,638,774 A | 6/1997 | Albertson et al. | |
| 6,427,640 B1 * | 8/2002 | Hickey .................. | F01M 5/007<br>123/41.31 |

(Continued)

OTHER PUBLICATIONS

International Search Report with Written Opinion from PCT/CA2014/050237.

*Primary Examiner* — Grant Moubry
(74) *Attorney, Agent, or Firm* — Marshall & Melhorn, LLC

(57) ABSTRACT

The invention relates to valve system configurations for an active warm-up (AWU) system for an automobile to improve warm-up conditions without delaying cabin warm-up or defrost times. More specifically, the invention relates to a system for heating/cooling transmission fluid of an automobile by controlling the source of the heat exchange fluid for transferring heat to/from the transmission fluid during different start-up conditions using a series of various valves arranged in series intermediate a first heat exchanger associated with cabin warm-up/defrost of the passenger compartment and a second heat exchanger for transferring heat to/from the transmission fluid.

22 Claims, 10 Drawing Sheets

(56) References Cited

U.S. PATENT DOCUMENTS

| | | |
|---|---|---|
| 6,520,136 B2 | 2/2003 | Ito et al. |
| 6,758,172 B2 | 7/2004 | Morgan et al. |
| 6,772,715 B2 | 8/2004 | Pfeffinger et al. |
| 6,830,527 B2 | 12/2004 | Wakayama |
| 6,843,211 B2 | 1/2005 | Iwasaki |
| 7,124,715 B2 | 10/2006 | Hutchins |
| 7,267,084 B2 | 9/2007 | Lütze et al. |
| 7,467,605 B2 | 12/2008 | Szalony et al. |
| 7,665,513 B2 | 2/2010 | Sasaki |
| 7,690,492 B2 | 4/2010 | Gooden et al. |
| 8,006,655 B2 | 8/2011 | Hiyama |
| 8,205,709 B2 * | 6/2012 | Gooden ............ B60H 1/14 123/41.31 |
| 8,342,418 B2 * | 1/2013 | Kanzaka ............ F01M 5/007 236/93 R |
| 8,434,386 B2 | 5/2013 | Gooden et al. |
| 9,321,479 B2 * | 4/2016 | Wankhede ............ B60H 1/14 |
| 2008/0276886 A1 | 11/2008 | Tsuji et al. |
| 2009/0101312 A1* | 4/2009 | Gooden ............ F16H 57/0413 165/104.19 |
| 2011/0061744 A1 | 3/2011 | Zillig et al. |
| 2011/0073285 A1 | 3/2011 | Benoit et al. |
| 2011/0120396 A1 | 5/2011 | Myers et al. |
| 2011/0172890 A1* | 7/2011 | Ulrey ............ F16H 57/0413 701/54 |
| 2011/0284200 A1 | 11/2011 | Gooden et al. |
| 2012/0102952 A1* | 5/2012 | Spohn ............ F01N 5/02 60/645 |
| 2013/0255604 A1 | 10/2013 | Rollinger et al. |

\* cited by examiner

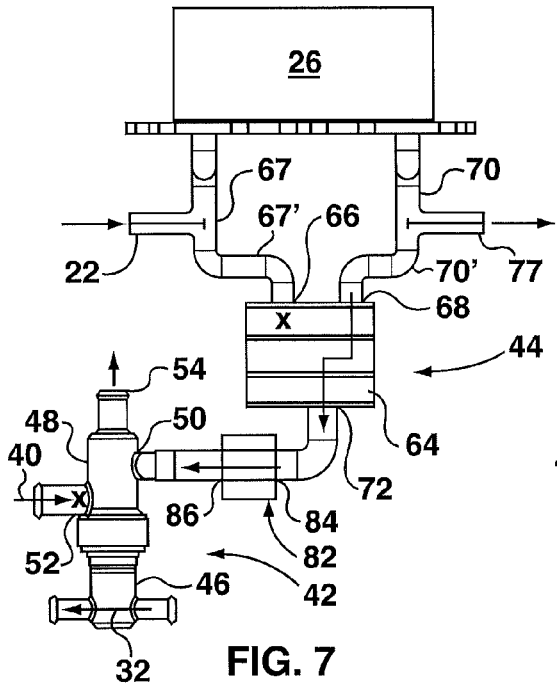 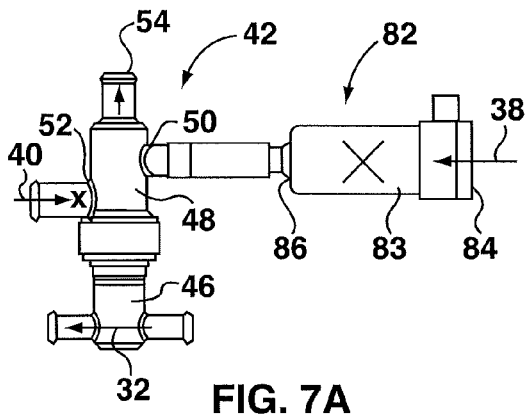
FIG. 7
FIG. 7A
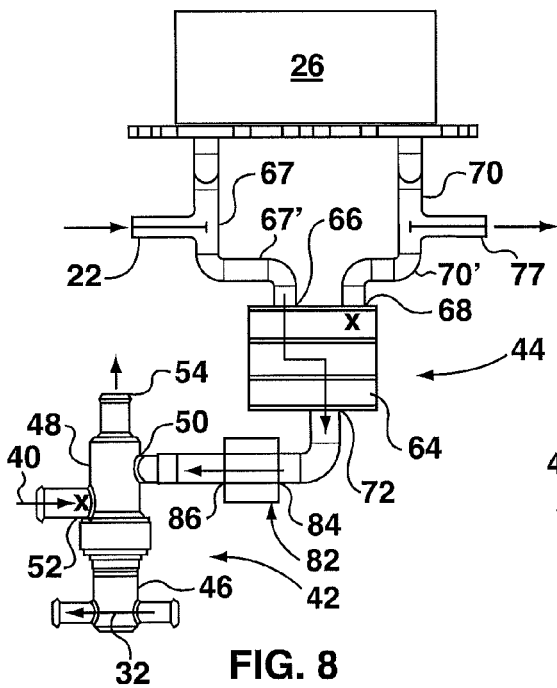 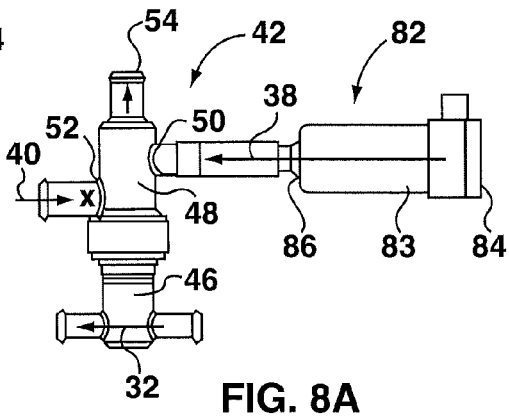
FIG. 8
FIG. 8A

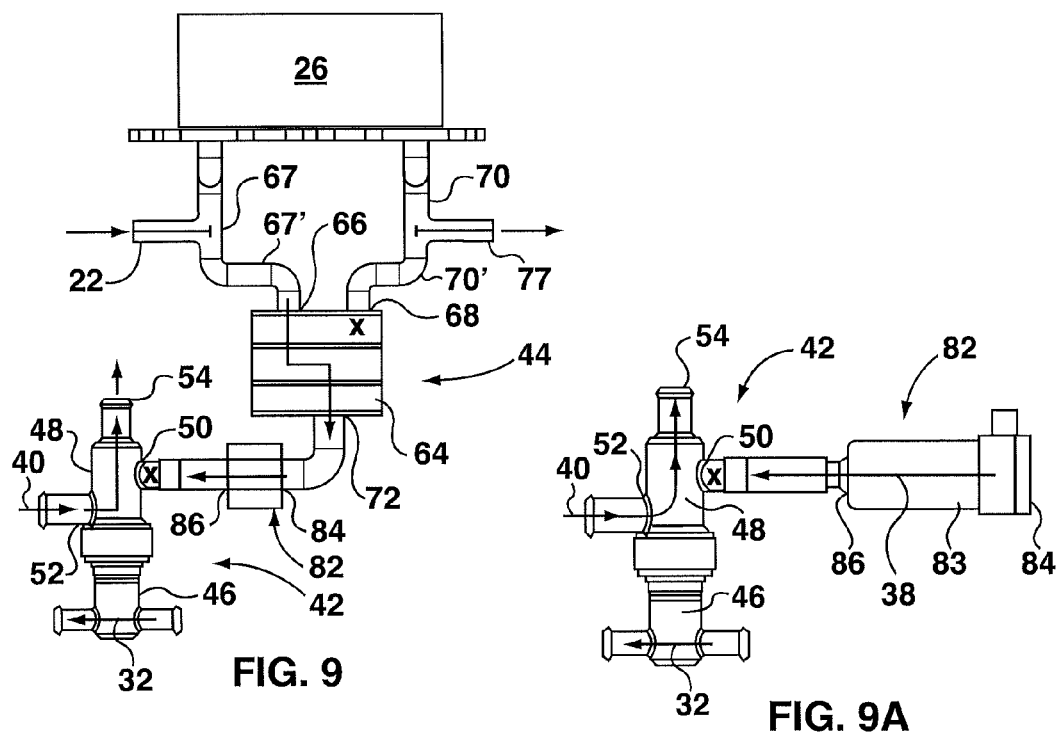

VALVE SYSTEM CONFIGURATIONS FOR WARMING AND COOLING TRANSMISSION FLUID

CROSS-REFERENCE TO RELATED APPLICATION

This application claims priority to and the benefit of U.S. Provisional Patent Application No. 61/787,168 filed Mar. 15, 2013 under the title VALVE SYSTEM CONFIGURATIONS FOR WARMING AND COOLING TRANSMISSION FLUID. The content of the above patent application is hereby expressly incorporated by reference into the detailed description of the present application.

TECHNICAL FIELD

The invention relates to valve system configurations for an active warm-up (AWU) system for an automobile to improve automobile system warm-up at cold start conditions without delaying cabin warm-up or defrost times. More specifically, the invention relates to a system for heating/cooling transmission fluid of an automobile by controlling the source of the heat exchange fluid that is delivered to a heat exchanger for transferring heat to or from the transmission fluid that is also delivered to the heat exchanger during various start-up conditions while also providing for cabin warm-up and/or defrost functions.

BACKGROUND

It is well understood in the automobile industry that automobiles function most efficiently once all fluids are circulating within the automobile systems at the optimum operating temperatures.

Active warm-up (AWU) systems have been designed in an effort to address the problem of quickly bringing fluids to optimal operating temperatures at automobile start-up, in particular cold start-up conditions. However, some AWU systems rely on removing heat from the system in an effort to quickly bring fluids to their optimal operating temperature which has an adverse effect on cabin warm-up and/or defrost times. In cold climate regions where passenger comfort and defrosting functions at cold start conditions are often considered a priority for users of the automobile, removing heat from the system in order to warm automobile fluids at the expense of cabin warm-up and/or defrost can be problematic. While other AWU systems attempt to improve warm-up at cold start conditions without adversely affecting cabin warm-up or defrost times, systems can be costly and can add to the complexity of the installation of the system and often favour either cabin warm-up or fluid warm-up at the expense of the other. In current economic climates where cost effectiveness and robustness of systems/components are valued and often considered a priority, an improved AWU system that aims to decrease the time it takes for key automobile fluids to reach their optimal operating temperature without delaying cabin warm-up and/or defrost times is desirable.

SUMMARY OF THE PRESENT DISCLOSURE

In accordance with an example embodiment of the present disclosure, there is provided a system for heating and cooling transmission fluid in an automobile vehicle, the automobile vehicle having a passenger compartment, an engine and a transmission, the system comprising a first heat exchanger fluidly connected to the engine and in communication with the passenger compartment, the first heat exchanger adapted to receive coolant exiting the engine, the first heat exchanger providing heat to the passenger compartment; a second heat exchanger fluidly connected to the transmission for receiving transmission fluid exiting the transmission and directing transmission fluid back to the transmission via a return line, the second heat exchanger adapted for receiving a second heat exchange fluid for heat transfer between the transmission fluid and the second heat exchange fluid; a first valve fluidly connected between the first heat exchanger and the second heat exchanger, the first valve adapted for receiving a first coolant source; and a second valve fluidly connected between the first valve and the second heat exchanger, the second valve adapted for selectively receiving the first coolant source from the first valve or a second coolant source; wherein the first coolant source is directed to the second heat exchanger in a warm-up mode of operation and the second coolant source is directed to the second heat exchanger in a cooling mode of operation.

In accordance with another example embodiment of the present disclosure there is provided a system for heating and cooling transmission fluid in an automobile vehicle, the automobile vehicle having a passenger compartment, an engine and a transmission, the system comprising a first heat exchanger fluidly connected to the engine and in communication with the passenger compartment, the first heat exchanger adapted to receive coolant exiting the engine, the first heat exchanger providing heat to the passenger compartment; a second heat exchanger fluidly connected to the transmission for receiving transmission fluid exiting the transmission and directing transmission fluid to the transmission via a return line, the second heat exchanger adapted for receiving a second heat exchange fluid for heat transfer between the transmission fluid and the second heat exchange fluid; a first valve fluidly connected between the first heat exchanger and the second heat exchanger, the first valve adapted for receiving a first coolant source, the first coolant source being one of a fluid stream of coolant exiting the engine or a fluid stream of engine coolant exiting the first heat exchanger; a second valve fluidly connected between the first valve and the second heat exchanger, the second valve also being in fluid communication with the transmission fluid exiting the transmission, the second valve adapted for selectively receiving the first coolant source or a second coolant source; wherein the first valve is operable for selecting the first coolant source and delivering the first coolant source to the second valve; and wherein the second valve is operable to selectively allow either the first coolant source of the second coolant source from being delivered to the second heat exchanger; the system having a first mode of operation wherein the first valve is in a first position selectively receiving the fluid stream of engine coolant exiting the first heat exchanger and delivering the first coolant source to the second heat exchanger by way of the second valve, the temperature of the transmission fluid being in a first temperature range and the temperature of the first coolant source being in a predetermined temperature range; a second mode of operation wherein the first valve is in a second position selectively receiving the fluid stream of engine coolant exiting the engine and entering the first heat exchanger and delivering the first coolant source to the second heat exchanger by way of the second valve, the temperature of the transmission fluid being in the first temperature range and the temperature of the first coolant source exceeding the predetermined temperature range; and a third mode of operation wherein fluid communication between the first valve and the second valve is closed, the second coolant source being directed through the second valve to the second heat exchanger when the temperature of the transmission fluid is in a second temperature range.

In accordance with another example embodiment of the present disclosure there is provided a method for heating and cooling transmission fluid in an automobile vehicle, the automobile vehicle having a passenger compartment, an engine and a transmission, the method comprising the steps of providing a first heat exchanger in fluid communication with the engine and in communication with the passenger compartment, the first heat exchanger adapted to receive coolant exiting the engine, the first heat exchanger providing heat to the passenger compartment; providing a second heat exchanger in fluid communication with the transmission for receiving transmission fluid exiting the transmission and directing transmission fluid to the transmission via a return line, the second heat exchanger adapted for receiving a second heat exchange fluid for heat transfer between the transmission fluid and the second heat exchange fluid; providing a first valve fluidly connected between the first heat exchanger and the second heat exchanger, the first valve adapted for receiving a first coolant source; providing a second valve fluidly connected between the first valve and the second heat exchanger, the second valve adapted for receiving the transmission fluid exiting the transmission and for selectively receiving the first coolant source or a second coolant source; supplying the first valve and the second heat exchanger with the same first coolant source in a first mode of operation providing heat to the passenger compartment and to the transmission fluid, the first coolant source being engine coolant exiting the first heat exchanger; supplying the first valve and the second heat exchanger with the same first coolant source in a second mode of operation providing heat to the passenger compartment and to the transmission fluid, the first coolant source being engine coolant exiting the engine and entering the first heat exchanger; and supplying the second heat exchanger with the second coolant source in a third mode of operation, the third mode of operation providing heat to the passenger compartment and providing cooling to the transmission fluid.

In accordance with another example embodiment of the present disclosure there is provided A method for heating and cooling transmission fluid in an automobile vehicle, the automobile vehicle having a passenger compartment, an engine and a transmission, the method comprising the steps of providing a first heat exchanger in fluid communication with the engine and in communication with the passenger compartment, the first heat exchanger adapted to receive coolant exiting the engine, the first heat exchanger providing heat to the passenger compartment; providing a second heat exchanger in fluid communication with the transmission for receiving transmission fluid exiting the transmission and directing transmission fluid to the transmission via a return line, the second heat exchanger adapted for receiving a second heat exchange fluid for heat transfer between the transmission fluid and the second heat exchange fluid; providing a first valve fluidly connected between the first heat exchanger and the second heat exchanger; providing a second valve fluidly connected between the first valve and the second heat exchanger; wherein the first valve is adapted for selectively receiving a first coolant source and directing the first coolant source to the second valve, and wherein the second valve is adapted for selectively receiving the first coolant source or a second coolant source and delivering either the first coolant source or the second coolant source to the second heat exchanger; supplying the first heat exchanger with the engine coolant exiting the engine and supplying the second heat exchanger with the first coolant source for warming the transmission fluid in warm-up mode of operation; and supplying the second heat exchanger with the second coolant source for cooling the transmission fluid in a cooling mode of operation.

BRIEF DESCRIPTION OF THE DRAWINGS

Exemplary embodiments of the present disclosure will now be described, by way of example, with reference to the accompanying drawings, in which:

FIG. 7 is a detail schematic diagram of a portion of the system configuration of FIG. 6 in a first mode of operation;

FIG. 7A is a detail schematic diagram of a portion of the system shown in FIG. 7;

FIG. 8 is a detail schematic diagram of a portion of the system of FIG. 6 in a second mode of operation;

FIG. 8A is a detail schematic diagram of a portion of the system shown in FIG. 8;

FIG. 9 is a detail schematic diagram of a portion of the system of FIG. 6 in a third mode of operation;

FIG. 9A is a detail schematic diagram of a portion of the system shown in FIG. 9;

DETAILED DESCRIPTION OF EXEMPLARY EMBODIMENTS

Figure 1:
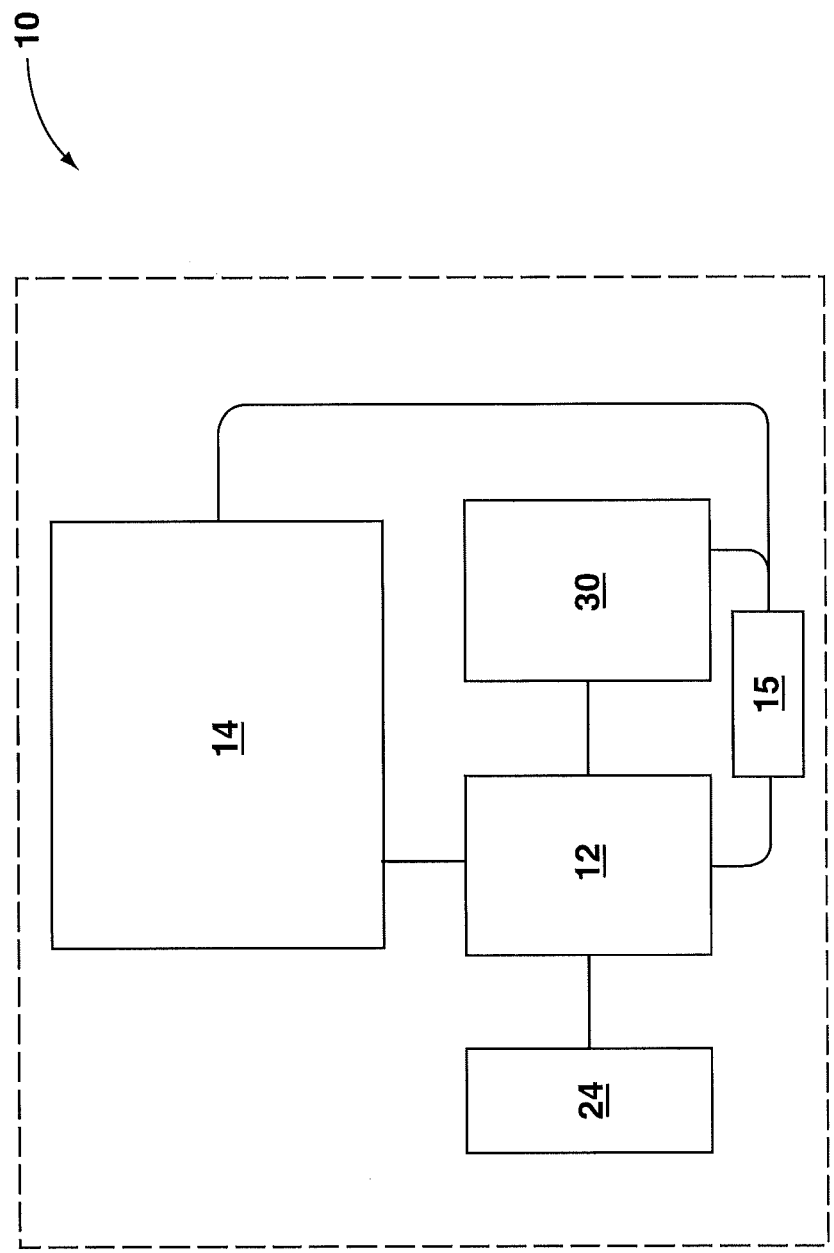
FIG. 1 is a schematic diagram showing an automotive vehicle incorporating an active warm-up system for heating/cooling transmission fluid in accordance with the present disclosure.

Referring to FIG. 1, there is shown generally a schematic representation of an automotive vehicle 10 that is powered by an internal combustion engine 12. Within the automotive vehicle 10 there is a passenger compartment 14 that is warmed/heated by means of heat that is transferred from the engine 12 through a heater core comprising a heat exchanger 26. Cooling circuits within automobile systems are known. It is also known that heat generated by the engine can be used to warm various automobile fluids, i.e. engine oil, transmission fluid, through various heat exchange circuits that are incorporated into the automobile system, sometimes referred to as an active warm-up system 15, which heat exchange circuits operate to ensure that the temperature of the automobile fluids reach and/or remain within a desired operating temperature range, as will be discussed in further detail below.

Figure 2:
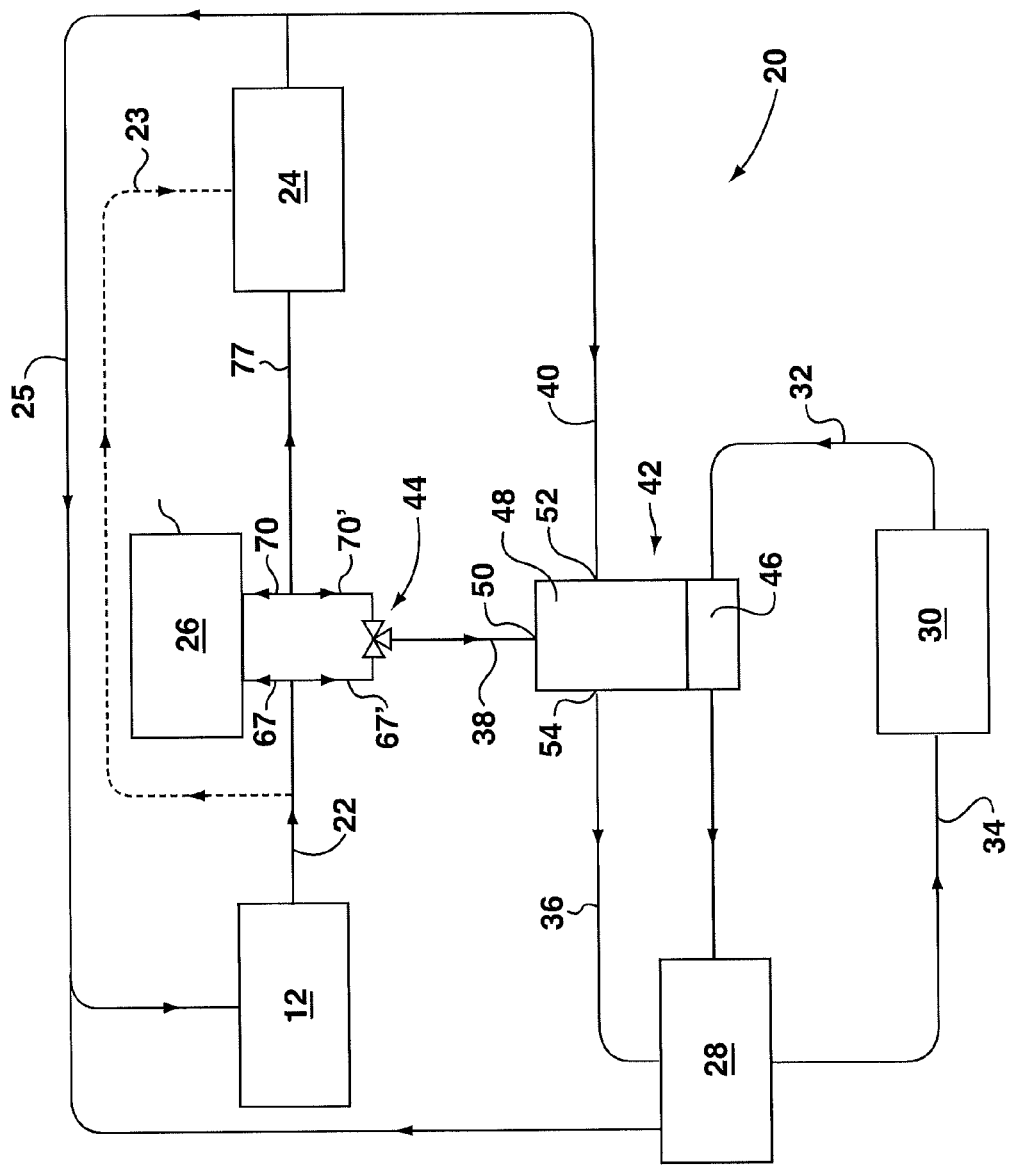
FIG. 2 is a schematic diagram of a first configuration of the system according to the present disclosure.

Referring now to FIG. 2, there is shown a schematic diagram of an exemplary embodiment of a first system configuration 20 according to the present disclosure. As is known in the art, an automobile system includes an engine cooling circuit that generally includes a warm/hot coolant line 22 exiting the internal combustion engine 12. The warm/hot coolant line 22 carries heat generated by the operation of the engine 12 away from the engine 12 and distributes it elsewhere in the system or removes it from the automobile system. The warm/hot engine coolant (or any other suitable fluid, as is known in the art) exiting the engine 12 is typically cooled within the engine cooling circuit before being returned to the engine 12. Accordingly, the warm/hot coolant line 22 exiting the engine 12 is generally directed away from the engine 12 to a heat exchanger 24, such as a radiator, arranged downstream within the system before being returned to the engine; see for instance fluid line 23. Heat extracted from the engine 12 through the warm/hot coolant line 22 exiting the engine, however, can also be used elsewhere in the automobile system before the engine coolant cooled by heat exchanger 24 and returned to the engine 12. More specifically, at cold start conditions fluids within the automobile system, such as the engine oil and transmission fluid (or oil), are not at optimal operating temperatures. At start-up, the fluids have increased viscosity due to the reduced temperature of the fluids which adversely affects the efficiency of the various automobile systems. As the temperature of the fluids increase, through operation of the automobile, the viscosity of the fluids is reduced and the fluids flow more efficiently through the fluid lines and components of the automobile systems resulting in more efficient overall operation of the automobile itself.

Heat extracted from the engine 12 by means of the coolant line 22 exiting the engine 12 can be used to assist with the warming of fluids, such as the transmission fluid, especially at cold-start conditions. However, it is also desirable to extract heat produced by the engine 12 in order to assist with cabin warm-up and/or defrost applications for the passenger compartment 14 of the automobile 10, especially in cold climate regions. Typically, cabin warm-up and/or defrost applications often come at the expense of fluid warm-up at cold start conditions, or vice versa. The system 20 according to the present disclosure offers a configuration that allows for warming of the transmission fluid at cold start conditions without depriving the passenger compartment 14 of cabin warm-up and/or defrost functions as will described in further detail below.

Referring again to FIG. 2, the coolant line 22 exiting the engine is directed towards heat exchanger (or radiator) 24 in order to cool the engine coolant before returning the coolant to the engine. Intermediate the engine 12 and heat exchanger 24 there is provided a first heat exchanger 26 arranged or fluidly coupled within the coolant line 22 exiting the engine 12. Heat exchanger 26 extracts heat from the engine coolant line 22 exiting the engine 12 for cabin warm-up and/or defrost functions associated with the passenger compartment 14 of the vehicle 10, heat exchanger 26 being any suitable heat exchanger as is known in the art configured for heat transfer between two fluids, e.g. the engine coolant and any suitable second heat exchange fluid. Accordingly, for the purpose of illustration, the coolant stream or fluid line 22 exiting the engine 12 can pass through heat exchanger 26 through fluid inlet line 67 and fluid outlet line 70, the heat from the coolant stream being primarily extracted by the heat exchanger 26, prior to the coolant entering the heat exchanger 24.

System 20 also comprises a second heat exchanger 28, often referred to as a transmission oil warmer (TOW) or transmission oil cooler (TOC), that operates to warm/cool the transmission fluid to the desired temperature depending on the particular operating conditions of the automobile 10. Heat exchanger 28 is arranged or fluidly coupled to the automobile transmission 30, the transmission fluid line 32 exiting the transmission 30 being directed towards heat exchanger 28 before being returned to the transmission 30 through return line 34. Heat exchanger 28 is also fluidly coupled to a coolant line 36 which serves as a second heat exchange fluid flowing through heat exchanger 28 to either warm/cool the transmission fluid. Accordingly, heat is transferred to or from the transmission fluid (or oil) exiting the transmission 30 by the second heat exchange fluid, e.g. the fluid flowing through, coolant or fluid line 36, in order to ensure that the transmission fluid reaches and/or maintains its optimal operating temperature.

Depending upon the operating conditions of the automobile, heat exchanger 28 is supplied with one of two fluid or engine coolant streams through coolant or fluid line 36 to serve as the second heat exchange fluid for either transferring heat to or removing heat from the transmission fluid/oil flowing through the heat exchanger 28. More specifically, heat exchanger 28 can be supplied with either a first coolant source 38 which is either the coolant stream derived from the coolant line 67, 67' exiting the engine 12 (or entering heat exchanger 26) which is generally considered to be a hot engine coolant stream, or the coolant stream derived from the coolant line 70, 70' exiting heat exchanger 26 which is also generally considered to be a warm/hot coolant stream although likely having a temperature less than the temperature of the fluid within coolant stream 67, 67', or the heat exchanger 28 can be supplied with a second coolant source 40, e.g. a cold or cooler fluid source, such as engine coolant from the engine coolant return line 25 exiting heat exchanger (or radiator) 24. Alternatively, the second coolant source 40 could be derived from any other cold coolant or fluid stream from elsewhere within the automobile system.

In the subject embodiment, two mechanical valves 42, 44 are arranged in series intermediate first heat exchanger 26 and second heat exchanger 28 within the coolant stream. Valves 42, 44 are arranged intermediate the two heat exchangers 26, 28 for controlling which coolant stream, i.e. the first or warm/hot coolant source 38 or the second or cold coolant source 40 is directed to the transmission oil warmer or second heat exchanger 28. The particular arrangement of valves 42, 44 allows for active warm-up of the transmission fluid at cold start conditions without delaying cabin warm-up since fluid is not prevented from entering heat exchanger 26 so as to disable cabin warm-up in favour of transmission warm-up as will be described in further detail below.

Valve 42 is a two chamber control valve having a first valve chamber 46 for sensing the temperature of a control fluid, the control fluid being the transmission fluid or oil exiting the transmission 30. The second valve chamber 48 is a three-port valve chamber and serves to direct coolant from either the first coolant source (i.e. a warm/hot coolant stream) 38 or from the second or cold coolant source 40 to heat exchanger 28. Valve chamber 48 has a first inlet port 50 fluidly coupled to first coolant source 38 and a second inlet port 52 fluidly coupled to the second coolant source 40.

Valve chamber 48 is also provided with outlet port 54 which is fluidly coupled to a coolant inlet port 36 of the second heat exchanger 28 (or transmission oil warmer). Valve chamber 46 and valve chamber 48 are fluidly isolated from each other in that fluid entering/exiting the first valve chamber 46 does not mix with or come into contact with the fluid entering/exiting the second valve chamber 48.

A thermal actuator (not shown) is disposed within the first valve chamber 46. As is known in the art, the thermal actuator includes an actuator piston movable from a first position to a second position by means of expansion/contraction of a thermal modulation device contained in the thermal actuator. The thermal modulation device expands/contracts in response to the temperature of the fluid entering valve chamber 46, namely the transmission fluid or oil. While reference is made to a thermal actuator and may comprise a thermal modulation device in the form of a wax motor, it will be understood that any suitable thermal actuator incorporating a thermal modulation device as known in the art may be used.

Figure 3:
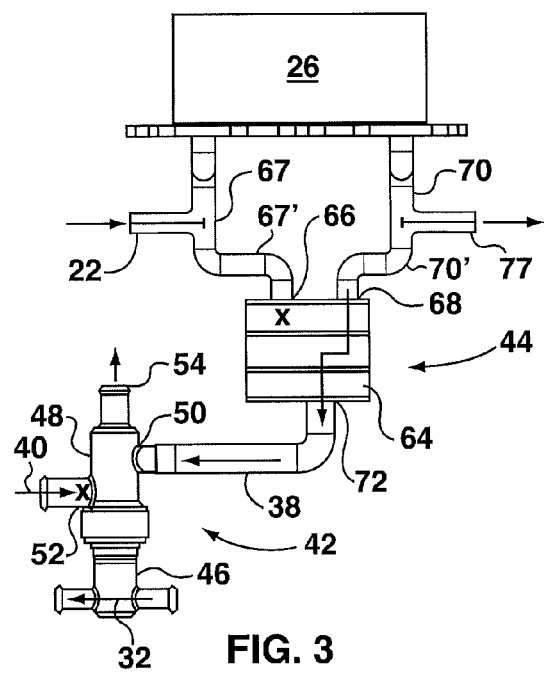
FIG. 3 is a detail schematic diagram of a portion of the system configuration of FIG. 1 in a first mode of operation.
Figure 4:
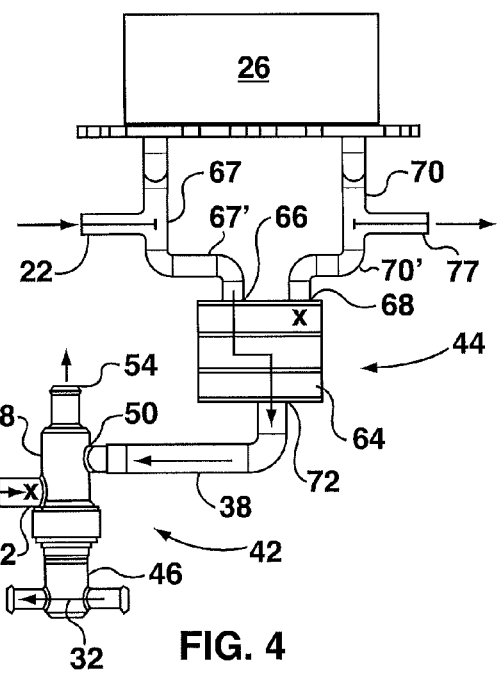
FIG. 4 is a detail schematic diagram of a portion of the system configuration of FIG. 2 in a second mode of operation.

A valve mechanism (such as a valve disk or spool valve mechanism as known in the art) is disposed within the second valve chamber 48 for controlling the flow of the second fluid entering the second valve chamber 48 of valve 42. The valve mechanism is operatively coupled to the thermal actuator and is moveable from a first valve position to a second valve position upon actuation by the thermal actuator. When the temperature of the fluid, i.e. the transmission oil, flowing through the first valve chamber 46 is low, such as at cold start conditions of the vehicle, the thermal modulation device in the thermal actuator and the actuator piston remain in their contracted state and the valve mechanism for valve 42 adopts the first valve position, shown schematically in both FIGS. 3 and 4. In the first valve position the valve mechanism is positioned so as to close the second inlet port 52 (represented in FIGS. 3 and 4 by the "x") allowing fluid to enter the second valve chamber 48 via the first inlet port 50 and exit the second valve chamber 48 through outlet port 54. As the temperature of the fluid in the first valve chamber 48 increases, the thermal modulation device in the thermal actuator expands causing the actuator piston to move the valve mechanism in the second valve chamber 48 into the second valve position, shown schematically in FIG. 5, wherein the second inlet port 52 opens as the first inlet port 50 closes allowing fluid to enter the second valve chamber 48 through inlet port 52 and exit the valve chamber 48 through outlet port 54.

Valve 44 is positioned upstream from valve 42 and is generally in the form of a three-port thermal bypass valve. As a result of the upstream position of valve 44 with respect to valve 42, valve 44 may be also referred to as a first valve 44 while valve 42 may be referred to as a second valve 42.

Valve 44 has an internal valve chamber 64 formed therein and is provided with a first inlet port 66 fluidly coupled to the fluid inlet line 67, 67' of heat exchanger 26 (which fluid line is an extension of coolant line 22 exiting the engine 12) and a second inlet port 68 fluidly coupled to the fluid outlet line 70, 70' of heat exchanger 26. Valve 44 is also provided with outlet port 72 which is fluidly coupled to the first coolant source 38 entering the first inlet port 50 of valve 42.

A thermal actuator and valve mechanism (not shown) are disposed within valve chamber 64 for controlling the flow of fluid through valve 44. As described above, the thermal actuator incorporates a thermal modulation device and an actuator piston for moving the valve mechanism from a first position to a second position as the temperature of the fluid flowing through valve chamber 64 (i.e. the engine coolant exiting the engine 12 or the engine coolant exiting heat exchanger 26) increases. At cold start conditions, when the engine is not operating at optimal temperatures and it is desirable to bring automobile fluids such as the transmission fluid or oil up to the desired operating temperature range and when it is also desirable to allow for cabin warm-up and/or defrost functions associated with the passenger compartment of the vehicle, the first valve 44 assumes its first position (shown schematically in FIG. 3) wherein the first inlet port 66 is closed (represented by the "x" shown in FIG. 3) and the second inlet port 68 is open. This first position of valve 44 forces the engine coolant exiting the engine 12 through coolant line 22 to flow through heat exchanger 26 due to the increased flow resistance created in fluid line 67' caused by the "closed" inlet port 66. The engine coolant exiting heat exchanger 26 is then directed through the second, open inlet port 68 of valve 44. As the temperature of engine coolant exiting heat exchanger 26 though coolant line 70, 70' increases, valve mechanism 76 moves from its first position to its second position shown schematically in FIG. 4 wherein first inlet port 66 opens while the second inlet port 68 closes (represented by the "x" shown in FIG. 4). While some engine coolant will continue to flow through heat exchanger 26 and on to the radiator or heat exchanger 24 for cooling through fluid line 77, a greater portion of the coolant from coolant line 22 will be directed through fluid line 67' to valve 44 through the first inlet port 66 due to the increased flow resistance created in fluid line 70' caused by the closed second inlet port 68, the coolant being directed on to first inlet port 50 of the second valve 42 through outlet port 72.

Figure 5:
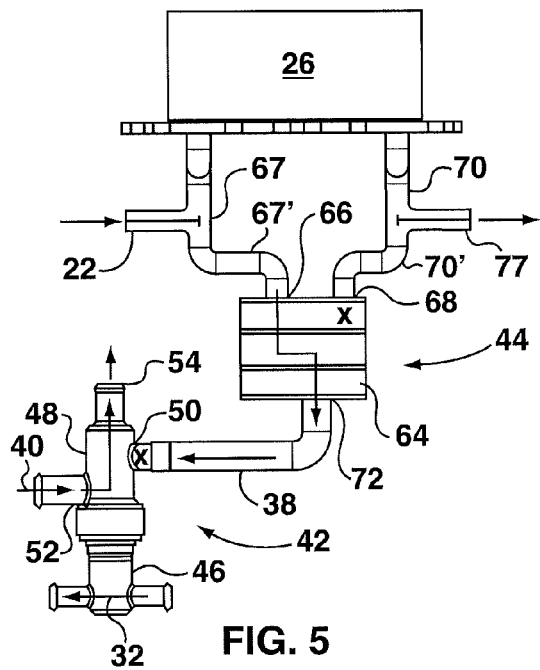
FIG. 5 is a detail schematic diagram of a portion of the system configuration of FIG. 2 in a third mode of operation.
Figure 6:
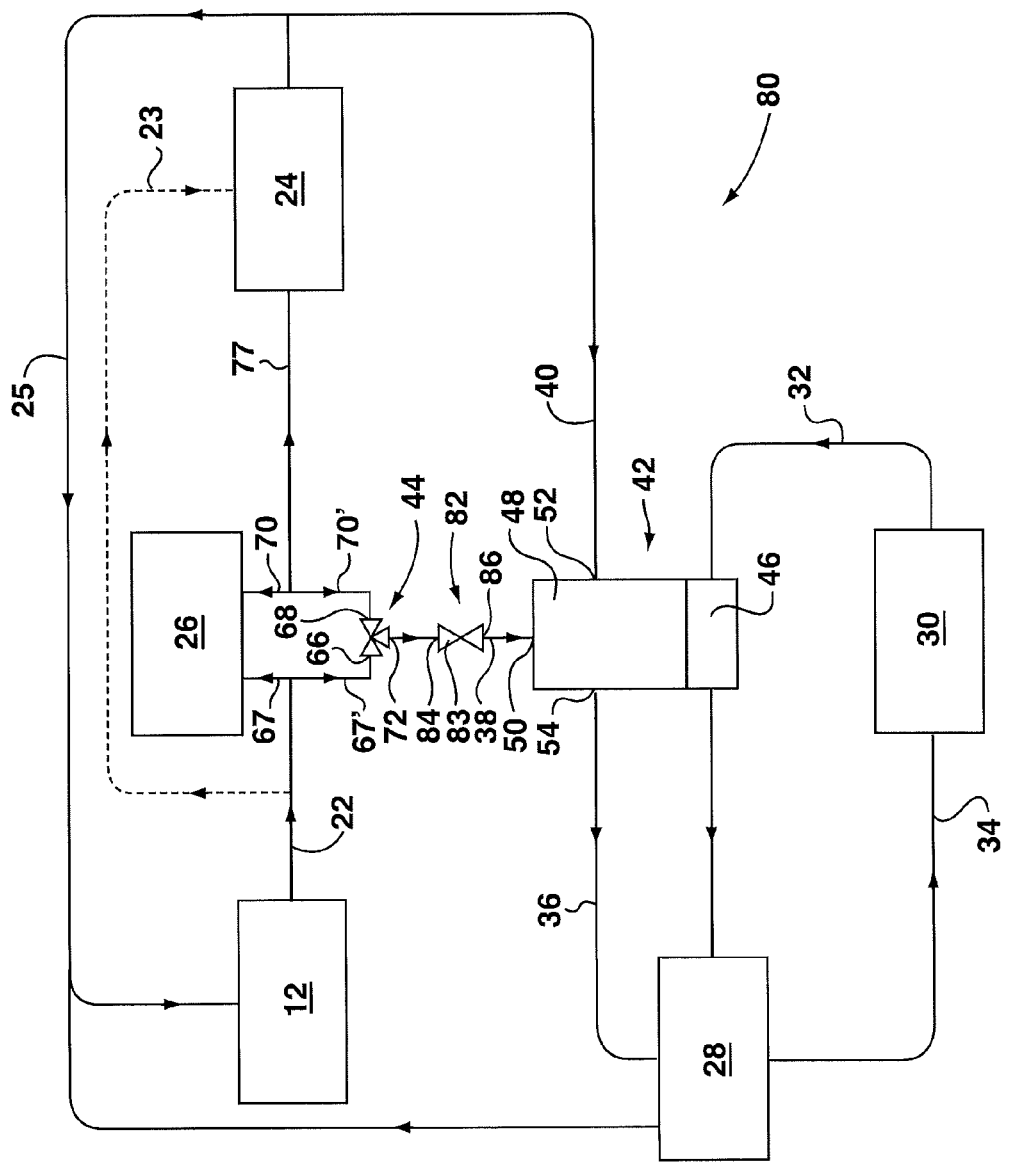
FIG. 6 is a schematic diagram of a second configuration of the system according to the present disclosure.

The typical temperature range of transmission oil in an automobile system is generally in the range of −30 to 170 degC, with the optimal operating temperature being in the range of 50 to 100 degC. When the temperature of the transmission fluid or transmission oil remains low or outside the optimal operating temperature range, the second valve 42 remains in its first position so that warm/hot coolant from the engine 12 is directed through outlet port 54 to heat exchanger 28 in order to provide for active warm-up of the transmission fluid flowing through heat exchanger 28 before it is returned to transmission 30. Valve 42 remains in its first position during cold start conditions (shown in FIG. 3) when valve 44 is in its first position and during the following "warm-start" conditions (shown in FIG. 4) that occur shortly after cold-start when valve 44 activates or assumes its second position. However, once the temperature of the transmission fluid reaches or exceeds its desired operating temperature, for example when the temperature of transmission oil is 50-100 degC or higher and no longer requires warming, expansion of the thermal modulation device in the thermal actuator located in the first valve chamber 46 causes valve 42 to move from its first position to its second position closing first inlet port 50 and opening second inlet port 52 as shown in FIG. 5. Closing first inlet port 50 further increases the flow resistance in fluid lines 67' and 70' which forces more of the engine coolant exiting the engine 12 through coolant line 22 to be directed on to the radiator or heat exchanger 24, for cooling. As the first inlet port 50 closes, the second inlet port 52 opens allowing the second coolant source 40 from a colder coolant/fluid source, such as coolant from the return line of the radiator or heat exchanger 24, to be directed through valve 42 to heat exchanger 28 in order to provide for cooling of the transmission fluid flowing through heat exchanger 28 in order to ensure that the temperature of the transmission fluid remains within the desired operating range.

By arranging valves 42 and 44 within the coolant stream or second heat exchange fluid stream that is directed to the transmission oil warmer or heat exchanger 28 intermediate heat exchanger 26 and heat exchanger 28, warm/hot coolant can be directed to heat exchanger 28 to provide for active warm-up of the transmission fluid without delaying cabin warm-up and/or defrost times associated with the passenger compartment of the vehicle since heat exchanger 26 is not deprived of warm/hot coolant from coolant line 22 at cold start conditions and during the warm-up period thereafter while automobile fluids achieve their optimal operating temperatures. A rather simple and robust active warm-up system for transmission fluid or oil is achieved by arranging mechanical, thermal valves 42, 44 in the coolant stream as described in the above system configuration.

Figure 2A:
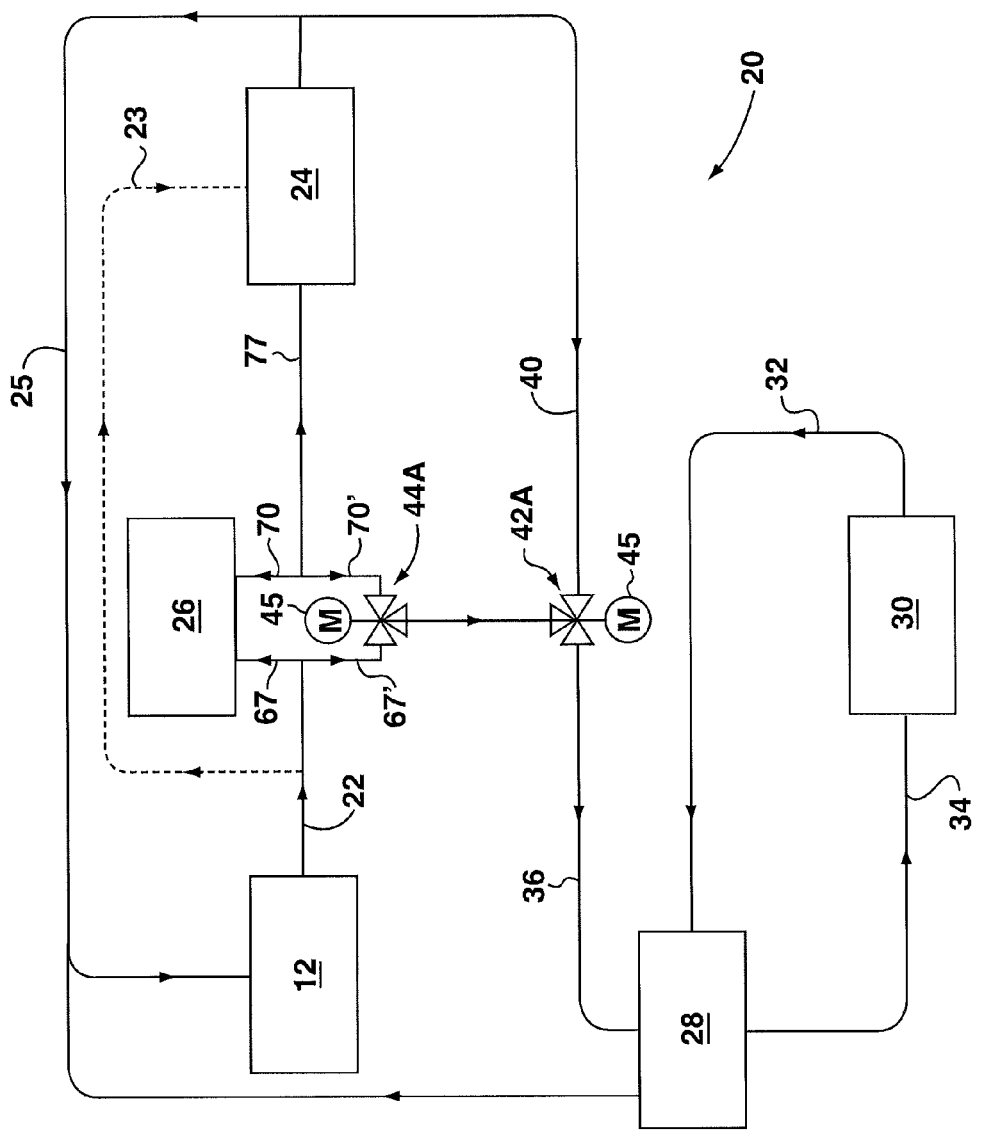
FIG. 2A is a schematic diagram of the system configuration shown in FIG. 2 employing electrically actuated valves.

While the embodiment described above relates to an active warm-up valve system configuration employing mechanical valves, electronic valves may also be used in order to achieve similar results. For instance, rather than employing a three-port thermal bypass valve 44 in series with a two-fluid thermal bypass valve 42 as shown in the system configuration of FIG. 2, valve 44 and valve 42 can each be replaced with a three-port electronically actuated proportional valve that is driven or controlled by a motor 45, for example, or by any other suitable means as is known in the art. More specifically, as shown in FIG. 2A, an electronically actuated proportional valve 44A is arranged intermediate heat exchanger 26 associated with cabin warm-up and heat exchanger 28 associated with transmission fluid heating/cooling with valve 44A being controlled to select between either the fluid or coolant stream 22, 67, 67' exiting the engine 12 or the fluid or coolant stream 70, 70' exiting heat exchanger 26, or a combination of the two fluid streams 67, 67', 70, 70'. The fluid stream selected by electronically actuated valve 44A is directed to the second electronically actuated valve 42A which is also a three-port control valve for selecting between the fluid stream exiting electronically actuated valve 44A and a second, cold fluid stream 40 such as the fluid exiting radiator 24. Depending on the particular setting of electronically activated valve 42A, the first fluid stream 38, the second fluid stream 40 or a proportion of the two fluid streams 38, 40 entering valve 44A is delivered to heat exchanger 28 for heat transfer with the transmission fluid/oil flowing through heat exchanger 28.

Therefore, it is to be understood, that whether mechanically actuated or electronically actuated valves are used, the valve system configuration illustrated in FIGS. 2 and 2A allow for both cabin-warm up and/or defrost operations as well as active warm-up of the transmission fluid/oil at cold start conditions without one application being unduly adversely affected by the other.

Referring now to FIGS. 6-9, there is shown a second configuration of the system of the present disclosure. System 80 is similar to the system 20 described above in connection with the first configuration accordingly like reference numerals will be used in order to refer to similar components.

System 80 is generally identical to system 20, the main difference being that a third valve 82 is incorporated into the system intermediate valves 42 and valve 44. Valve 82 is generally in the form of a two-port thermal mechanical valve with valve chamber 83 and an inlet port 84 in fluid communication with the outlet port 72 of first valve 44 and an outlet port 86 in fluid communication with the first inlet port 50 of second valve 42. A thermal actuator is disposed within valve chamber 83, the thermal actuator comprising a thermal modulation device for controlling an actuator piston and a valve mechanism, the valve mechanism moving from a first, closed position to a second, open position based on the temperature of the fluid entering valve chamber 83 through inlet port 84. During cold start conditions when it is desirable for cabin warm-up and/or defrost functions associated with the passenger compartment of the vehicle to be given priority, valve 44 is in its first position thereby directing the engine coolant exiting the engine 12 through coolant line 22 to be directed through fluid inlet line 67 to heat exchanger 26 and then to valve 44 through fluid outlet line 70, 70'. Valve 82 also assumes its first or closed position during cold start conditions as shown schematically in the detail portion of FIG. 7. By closing inlet port 84 of valve 82, fluid resistance within the fluid line interconnecting the first and second valves is increased effectively reducing or preventing fluid access to inlet port 52 of valve 42 although it will be understood that some leakage though valve 82 will occur as is known in the art. By closing inlet port 84 of valve 82, the flow resistance in fluid line 67' increases which action results in a greater portion of the engine coolant exiting the engine 12 through coolant line 22 to pass through fluid line 67 to heat exchanger 26. This valve arrangement, i.e. having a third valve 82 arranged in series intermediate the first and second valves 44, 42, results in an increased amount of heat being extracted from the engine coolant via heat exchanger 26 for cabin warm-up and/or defrost functions.

As the temperature of the fluid exiting heat exchanger 26 and entering valve 44 and valve 82 reaches a predetermined temperature optimized for the operating condition of the vehicle, selected from the range of 35 degC to 45 degC, for example when the fluid or engine coolant exiting heat exchanger 26 is approximately 40 deg. C, the predetermined temperature being indicative of a certain degree of cabin warm-up and/or defrost during the warm-up period subsequent to cold start conditions, valve 82 begins to move from its first, closed position to its second open position allowing some of the "warm" coolant exiting heat exchanger 26 to pass through valve 44 and valve 82 to inlet port 52 of valve 42 to provide warming to the transmission fluid through heat exchanger 28. Valve 44 activates simultaneously or immediately after valve 82 is activated to move from its first open position receiving fluid exiting heat exchanger 26 through fluid line 70, 70' to its second open position receiving the fluid stream entering heat exchanger 26 though fluid line 67, 67'. Once third valve 82 and first valve 44 have activated system 80 shifts from a "cabin-priority" first mode of operation to a "transmission fluid active warm-up" second mode of operation where transmission fluid warm-up is given priority over cabin warm-up.

As described above in connection with the first system configuration 20, once the temperature of the transmission fluid flowing through first valve chamber 46 reaches its optimal operating temperature, the valve mechanism positioned in the second valve chamber 48 moves from its first position to its second position opening second inlet port 54 and closing first inlet port 50 to begin cooling the transmission fluid. Once valve 42 activates to begin cooling the transmission fluid in heat exchanger 28, the increased flow resistance in fluid lines 38, 67, 67' due to the closure of first inlet port 52 causes the engine coolant exiting engine 12 via coolant line 22 to be primarily directed elsewhere in the system, i.e. through radiator or heat exchanger 24 and returned to the engine 12.

Figure 10:
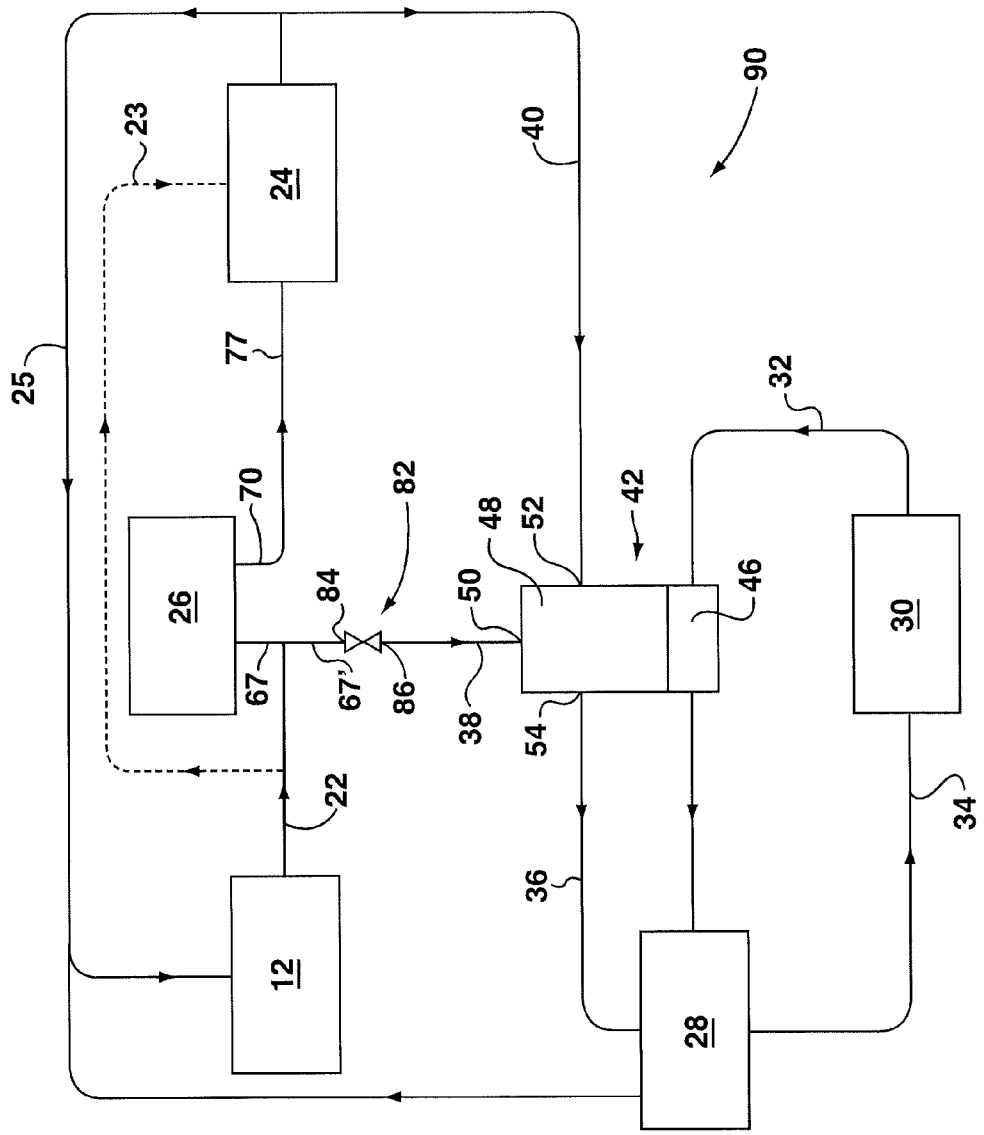
FIG. 10 is a schematic diagram of a third configuration of the system according to the present disclosure.
Figure 11:
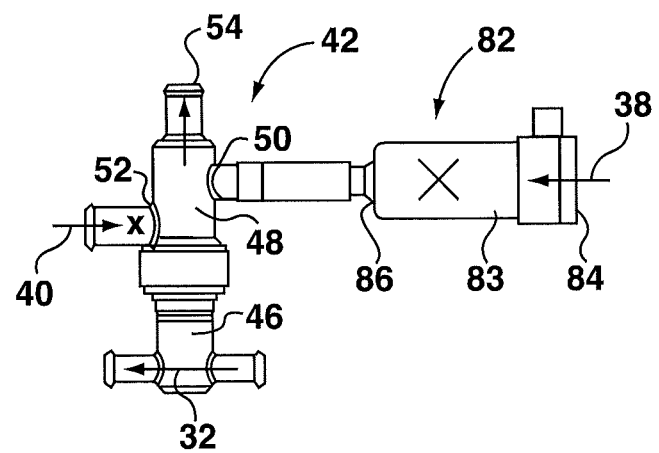
FIG. 11 is a detail schematic diagram of a portion of the system configuration shown in FIG. 10 in a first mode of operation.
Figure 12:
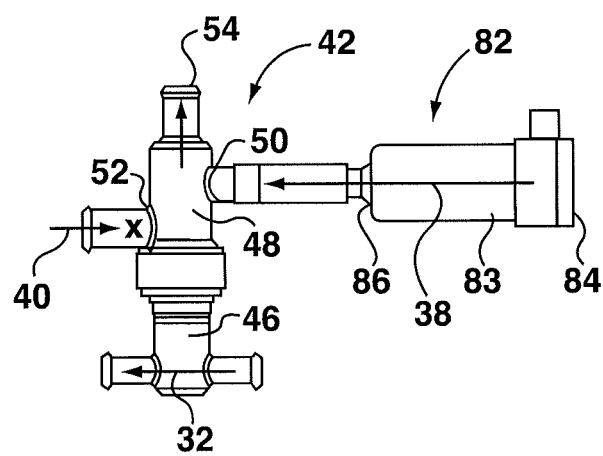
FIG. 12 is a detail schematic diagram of a portion of the system configuration shown in FIG. 10 in a second mode of operation.

A third system configuration is shown in FIGS. 10-12. System 90 is similar to both system 20 and system 80 described above in connection with the first and second system configurations accordingly like reference numerals will be used in order to refer to similar components.

In this exemplary embodiment, system 90 comprises two-fluid control valve 42 arranged in series with the two-port thermal mechanical valve 82 with the inlet port 84 of valve 82 being fluidly coupled or arranged in the fluid inlet line 67, 67' to heat exchanger 26 and the outlet port 86 being fluidly coupled to the first inlet port 50 of valve 42. Accordingly, in this particular system configuration, valve 82 is the first valve as it is located upstream relative to second valve 42.

At cold start conditions when it is desirable to give cabin warm-up and defrost functions priority, valve 82 is in its first or closed position (shown schematically in FIG. 11) effectively preventing the warm/hot coolant exiting the engine 12 through coolant line 22 from being directed to heat exchanger 28 through valve 82 and valve 42 (although it will be understood in the art that some leakage past valve 82 will occur). In this first mode of operation, the warm/hot coolant exiting the engine through coolant line 22 is primarily directed through heat exchanger 26 to provide for cabin warm-up and defrost functions before being returned to the engine 12 through return line 25.

Once the engine coolant exiting engine 12 through coolant line 22 reaches a predetermined temperature, as sensed by the thermal modulation device forming part of valve 82, valve 82 moves to its second, open position (shown schematically in FIG. 12) thereby establishing fluid communication between the outlet port 86 of valve 82 and the first inlet port 50 of valve 42 and, ultimately, heat exchanger 28 to allow for active warm-up of the transmission fluid. Once valve 82 activates and assumes its second, open position, system 90 effectively shifts from a "cabin-priority" first mode of operation to a "transmission fluid active warm-up" second mode of operation where transmission fluid warm-up is given priority over cabin warm-up.

As in the previously described embodiments, once the temperature of the transmission fluid flowing through the first valve chamber 46 reaches its desired operating temperature, valve 42 activates due to expansion of the thermal material contained in the wax motor causing the valve mechanism positioned in first valve chamber 48 to move from its first position to its second position closing first inlet port 50 to the warm/hot coolant source 38 and opening second inlet port 52 to a cold coolant source 40 from elsewhere in the system to begin cooling the transmission fluid in heat exchanger 28. As shown in the diagram, the cold coolant source may be associated with the coolant stream exiting heat exchanger/radiator 24 (see fluid stream 40 in FIG. 10). However, it will be understood that the cold coolant stream entering inlet port 52 of valve 42 may be sourced from elsewhere in the automobile system in accordance with principles known in the art.

System 90 does not include three-port thermal bypass valve 44 and therefore only provides control as to whether a warm/hot coolant supply from coolant liner 22 is directed to heat exchanger 28 through valve 42 to warm/heat transmission fluid or if the same warm/hot coolant stream is directed through heat exchanger 26 to provide for cabin warm-up and/or defrost. Accordingly, system 90 does not provide for the same level of control as provided by system 20 or system 80 described above which systems operatively select between the coolant exiting heat exchanger 26 through fluid line 70, 70' or the coolant exiting the engine 12 directly through coolant line 22. Nevertheless, system 90 once again provides for a robust and cost effective system for providing an active warm-up system configuration for an automobile providing both a cabin warm-up priority mode and a transmission fluid warm-up priority mode.

Figure 10A:
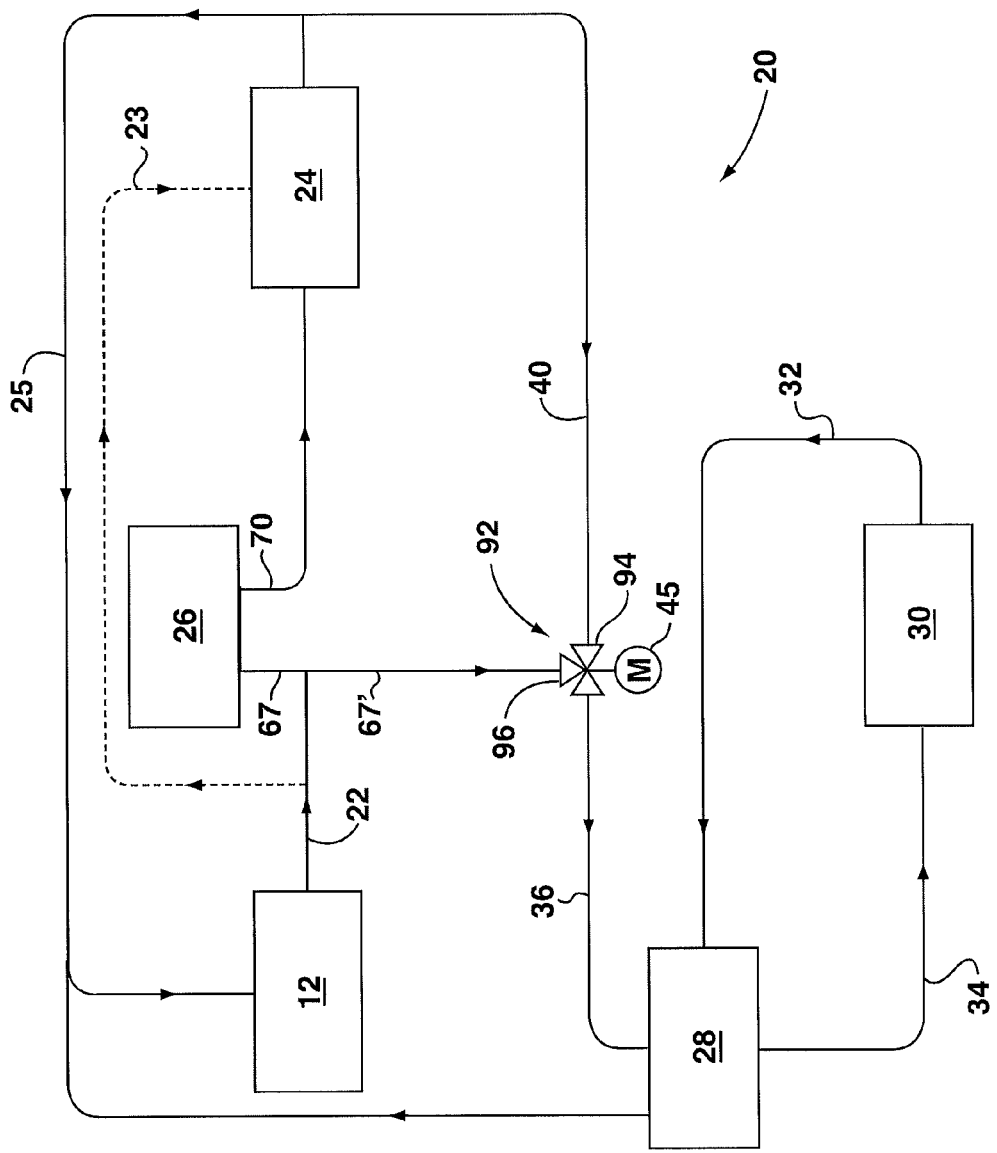
FIG. 10A is a schematic diagram of the system configuration as shown in FIG. 10 employing an electrically actuated valve.

While the embodiment described above relates to an active warm-up valve system configuration employing a two-port mechanically actuated thermal bypass valve 82 arranged in series with a two-fluid mechanically actuated thermal bypass valve 42 intermediate heat exchanger 26 and heat exchanger 28, a three-port, electronically actuated valve can be used in place of both valves 82 and 42 in order achieve similar results. More specifically, as shown in FIG. 10A, a three-port electronically actuated proportional valve 92 can be arranged or fluidly coupled between heat exchanger 26 and heat exchanger 28 so as to select between the coolant or fluid stream 22, 67, 67' exiting the engine 12, the coolant or fluid stream exiting the radiator 24, or a mixture thereof depending upon the particular position or setting of the valve mechanism within valve 92. Valve 92 may be actuated or controlled by a motor 45 or by any other suitable means as is known in the art. At cold start conditions where it is desirable to allow for both cabin warm-up (and/or defrost operations) as well as fluid warm-up, valve 92 is set so as to close the fluid port 94 that is in communication with the fluid stream 40 exiting the radiator and opening the fluid port 96 in communication with the coolant or fluid stream 22, 67, 67' exiting the engine 12 and entering heat exchanger 26. Since the valve 92 is arranged in a branch 67' of the fluid stream 22 exiting the engine 12 and does not necessarily prevent fluid from entering heat exchanger 26, some fluid or engine coolant will continue to flow through heat exchanger 26 to allow for cabin warm-up and/or defrost operations while some fluid will be directed through valve 92 to heat exchanger 28 to allow for transmission fluid warm-up. While a greater proportion of fluid or coolant may be directed through the valve 92 when it is in its first open position at cold start conditions due to less fluid resistance within the fluid line 67', valve 92 does not close the fluid line 67 entering heat exchanger 26 effectively disabling cabin warm-up. As the temperature of the engine 12 increases and the transmission fluid begins to warm-up, valve 92 can start to move from its first open position to its second open position effectively closing the fluid port 96 and opening fluid port 94, allowing for cooling of the transmission fluid within heat exchanger 28.

While various valve system configurations have been described in connection with the present disclosure, it will be understood that certain adaptations and modifications of the described exemplary embodiments can be made as construed within the scope of the present disclosure. Therefore, the above discussed embodiments are considered to be illustrative and not restrictive.

What is claimed is:

1. A system for heating and cooling transmission fluid in an automobile vehicle, the automobile vehicle having a passenger compartment, an engine and a transmission, the system comprising:

a first heat exchanger fluidly connected to the engine and in communication with the passenger compartment, the first heat exchanger adapted to receive coolant exiting the engine, the first heat exchanger providing heat to said passenger compartment;

a second heat exchanger fluidly connected to the transmission for receiving transmission fluid exiting the transmission and directing transmission fluid back to the transmission via a return line, the second heat exchanger adapted for receiving a second heat exchange fluid for heat transfer between the transmission fluid and the second heat exchange fluid;

a first valve fluidly connected between the first heat exchanger and the second heat exchanger, the first valve adapted for receiving a first coolant source; and a second valve fluidly connected between the first valve and the second heat exchanger, the second valve adapted for selectively receiving the first coolant source from said first valve or a second coolant source;

wherein said first coolant source is directed to said second heat exchanger in a warm-up mode of operation and said second coolant source is directed to said second heat exchanger in a cooling mode of operation.

2. The system as claimed in claim 1, wherein the first coolant source is one of a fluid stream of engine coolant exiting the engine and entering the first heat exchanger or a fluid stream of engine coolant exiting the first heat exchanger; and wherein the second coolant source is a cold coolant source for transferring heat away from the transmission fluid in said second heat exchanger in another mode of operation.

3. The system as claimed in claim 2, wherein:

the first valve is a mechanical thermal bypass valve having a first inlet port in communication with said fluid stream of engine coolant exiting the engine, a second inlet port in fluid communication with said fluid stream of engine coolant exiting said first heat exchanger and an outlet port for delivering said first coolant source to said second valve, the first valve having a first position open to said second inlet port and a second position open to said first inlet port, the first valve being thermally actuated between said first and second positions in response to a temperature of the first coolant source; and wherein the second valve is also in fluid communication with the transmission fluid exiting the transmission, the second valve being a two fluid mechanical thermal bypass valve having a first valve chamber for sensing a temperature of the transmission fluid exiting the transmission and a second valve chamber adapted to selectively allow the first coolant source or the second coolant source from being directed to said second heat exchanger based on the temperature of the transmission fluid sensed in the first valve chamber.

4. The system as claimed in claim 3, further comprising a third valve fluidly connected between the first valve and the second valve, wherein the third fluid valve is adapted to selectively prevent or allow the first coolant source from being directed from said first valve to said second valve.

5. The system as claimed in claim 4, wherein the third valve has a first, closed position for increasing fluid resistance between said first and second valves, and a second, open position decreasing fluid resistance between the first and second valves thereby allowing an increased amount of the first coolant source to be directed to the second valve in the warm-up mode of operation.

6. The system as claimed in claim 5, wherein said third valve comprises a thermal actuator for sensing the temperature of the first coolant source entering said third valve; and a valve mechanism operatively coupled to the thermal actuator for moving the third valve from said first position to said second position.

7. The system as claimed in claim 3, wherein said second valve comprises a thermal actuator in said first chamber operatively coupled to a valve mechanism positioned in said second valve chamber.

8. The system as claimed in claim 3, wherein the first valve has a valve chamber, the first and second inlet ports and the outlet port being in fluid communication with said valve chamber, a thermal actuator positioned in said valve chamber and operatively coupled to a valve mechanism, the valve mechanism having a first position wherein said first inlet port is closed and said second inlet port is open and a second position wherein the first inlet port is open and said second inlet port is opened.

9. The system as claimed in claim 8, wherein said valve mechanism moves from said first position to said second position in response to the temperature of the first coolant source entering said valve chamber sensed by said thermal actuator.

10. The system as claimed in claim 1, wherein:

the first valve is an electronically activated proportional valve having a first inlet port in fluid communication with a fluid stream of engine coolant exiting the engine, a second inlet port in fluid communication with a fluid stream of engine coolant exiting the first heat exchanger and an outlet port for delivering said first coolant source to said second valve, the first valve having a first position open to said second inlet port and a second position open to said first inlet port, the first valve being electronically actuated between said first and second positions based on a temperature of the first coolant source; and the second valve is an electronically activated proportional valve a first inlet port for receiving the first coolant source delivered from the first valve, a second inlet port for receiving a second coolant source, and an outlet port for delivering one of the first coolant source, the second coolant source, or a mixture thereof to said second heat exchanger.

11. The system as claimed in claim 10, wherein said electronically actuated proportional valves are controlled by a motor.

12. The system as claimed in claim 1, the system comprising: a first mode of operation wherein the first coolant source is a fluid stream of coolant exiting the first heat exchanger, the first coolant source being directed through the second valve to the second heat exchanger when a temperature of the transmission fluid is in a first temperature range, the first mode of operation being part of the warm-up mode of operation;

a second mode of operation wherein the first coolant source is a fluid stream of coolant exiting the engine and entering the first heat exchanger, the first coolant source being directed through the second valve to the second heat exchanger when the temperature of the transmission fluid is in the first temperature range, the second mode of operation being part of the warm-up mode of operation; and a third mode of operation wherein the second coolant source is directed through the second valve to the second heat exchanger when the temperature of the transmission fluid is in a second temperature range, the third mode of operation being said cooling mode of operation.

13. The system as claimed in claim 1, wherein the first valve has a first, closed position for preventing the first coolant source from being directed to the second valve in a first mode of operation, and a second, open position allowing the first coolant source to be directed to the second valve in a second mode of operation, wherein the first coolant source is a fluid stream exiting the engine, the first mode of operation and the second mode of operation being part of the warm-up mode of operation.

14. A system for heating and cooling transmission fluid in an automobile vehicle, the automobile vehicle having a passenger compartment, an engine and a transmission, the system comprising:
- a first heat exchanger fluidly connected to the engine and in communication with the passenger compartment, the first heat exchanger adapted to receive coolant exiting the engine, the first heat exchanger providing heat to said passenger compartment;
- a second heat exchanger fluidly connected to the transmission for receiving transmission fluid exiting the transmission and directing transmission fluid to the transmission via a return line, the second heat exchanger adapted for receiving a second heat exchange fluid for heat transfer between the transmission fluid and the second heat exchange fluid;
- a first valve fluidly connected between the first heat exchanger and the second heat exchanger, the first valve adapted for receiving a first coolant source, the first coolant source being one of a fluid stream of coolant exiting the engine or a fluid stream of engine coolant exiting the first heat exchanger;
- a second valve fluidly connected between the first valve and the second heat exchanger, the second valve also being in fluid communication with the transmission fluid exiting the transmission, the second valve adapted for selectively receiving the first coolant source or a second coolant source;
- wherein the first valve is operable for selecting said first coolant source and delivering said first coolant source to said second valve; and
- wherein the second valve is operable to selectively allow either the first coolant source of the second coolant source from being delivered to said second heat exchanger; the system having:
- a first mode of operation wherein the first valve is in a first position selectively receiving the fluid stream of engine coolant exiting the first heat exchanger and delivering said first coolant source to said second heat exchanger by way of said second valve, a temperature of the transmission fluid being in a first temperature range and a temperature of the first coolant source being in a predetermined temperature range;
- a second mode of operation wherein the first valve is in a second position selectively receiving the fluid stream of engine coolant exiting the engine and entering the first heat exchanger and delivering said first coolant source to said second heat exchanger by way of said second valve, the temperature of the transmission fluid being in said first temperature range and the temperature of the first coolant source exceeding said predetermined temperature range; and
- a third mode of operation wherein fluid communication between the first valve and the second valve is closed, the second coolant source being directed through the second valve to the second heat exchanger when the temperature of the transmission fluid is in a second temperature range.

15. The system as claimed in claim 14, wherein the second coolant source is a cold coolant source for transferring heat away from the transmission fluid in said second heat exchanger in said third mode of operation.

16. The system as claimed in claim 14, wherein the second coolant source is engine coolant exiting a radiator.

17. The system as claimed in claim 14, wherein the first valve is a three-port mechanically actuated thermal bypass valve and said second valve is a two-fluid mechanically actuated thermal bypass valve.

18. The system as claimed in claim 14, wherein said first and second valves are three-port electronically actuated proportional valves.

19. A method for heating and cooling transmission fluid in an automobile vehicle, the automobile vehicle having a passenger compartment, an engine and a transmission, the method comprising:
- providing a first heat exchanger in fluid communication with the engine and in communication with the passenger compartment, the first heat exchanger adapted to receive coolant exiting the engine, the first heat exchanger providing heat to said passenger compartment;
- providing a second heat exchanger in fluid communication with the transmission for receiving transmission fluid exiting the transmission and directing transmission fluid to the transmission via a return line, the second heat exchanger adapted for receiving a second heat exchange fluid for heat transfer between the transmission fluid and the second heat exchange fluid;
- providing a first valve fluidly connected between the first heat exchanger and the second heat exchanger, the first valve adapted for receiving a first coolant source;
- providing a second valve fluidly connected between the first valve and the second heat exchanger, the second valve adapted for receiving the transmission fluid exiting the transmission and for selectively receiving the first coolant source or a second coolant source;
- supplying said first valve and said second heat exchanger with the first coolant source in a first mode of operation providing heat to said passenger compartment and to said transmission fluid, the first coolant source being engine coolant exiting the first heat exchanger;
- supplying said first valve and said second heat exchanger with the first coolant source in a second mode of operation providing heat to said passenger compartment and to said transmission fluid, the first coolant source being engine coolant exiting the engine and entering the first heat exchanger; and
- supplying said second heat exchanger with said second coolant source in a third mode of operation, the third mode of operation providing heat to said passenger compartment and providing cooling to said transmission fluid.

20. A method for heating and cooling transmission fluid in an automobile vehicle, the automobile vehicle having a passenger compartment, an engine and a transmission, the method comprising:
- providing a first heat exchanger in fluid communication with the engine and in communication with the passenger compartment, the first heat exchanger adapted to receive coolant exiting the engine, the first heat exchanger providing heat to said passenger compartment;
- providing a second heat exchanger in fluid communication with the transmission for receiving transmission fluid exiting the transmission and directing transmission fluid to the transmission via a return line, the second heat exchanger adapted for receiving a second heat exchange fluid for heat transfer between the transmission fluid and the second heat exchange fluid;
- providing a first valve fluidly connected between the first heat exchanger and the second heat exchanger;
- providing a second valve fluidly connected between the first valve and the second heat exchanger;

wherein the first valve is adapted for selectively receiving a first coolant source and directing the first coolant source to said second valve, and wherein the second valve is adapted for selectively receiving the first coolant source or a second coolant source and delivering either said first coolant source or said second coolant source to said second heat exchanger;

supplying said first heat exchanger with said engine coolant exiting the engine and supplying said second heat exchanger with said first coolant source for warming said transmission fluid in a warm-up mode of operation; and supplying said second heat exchanger with said second coolant source for cooling said transmission fluid in a cooling mode of operation.

21. The method as claimed in claim 20, wherein the first coolant source is engine coolant exiting the engine.

22. The method as claimed in claim 20, wherein the first coolant source is one of the engine coolant exiting the first heat exchanger in a first warm-up mode of operation or the engine coolant exiting the engine in a second warm-up mode of operation.

* * * * *